United States Patent [19]

Masegian

[11] 4,194,724
[45] Mar. 25, 1980

[54] CHAINMATE

[76] Inventor: Gregory Masegian, 209 El Camino Del Mar, Aptos, Calif. 95003

[21] Appl. No.: 21,356

[22] Filed: Mar. 19, 1979

[51] Int. Cl.² .......................... E02C 3/00; G08B 7/00
[52] U.S. Cl. .................................. 254/88; 116/28 R; 116/67 R; 116/148; 152/213 R
[58] Field of Search ...................... 254/1, 88; 152/213; 116/148, 67 R, 98, 28 R

[56] References Cited
U.S. PATENT DOCUMENTS

| 2,623,491 | 12/1952 | Andrews | 116/67 R |
| 2,784,692 | 3/1957 | Ballesteros | 116/28 R |
| 3,847,376 | 11/1974 | Binding | 254/88 |
| 4,031,939 | 6/1977 | Martini | 254/88 |
| 4,050,403 | 9/1977 | Miller | 254/88 X |

*Primary Examiner*—Robert C. Watson

[57] ABSTRACT

A wooden block, upon which an automobile wheel can climb, to facilitate tire chain installation, the block including an inclined ramp at one end, and a pair of transverse grooves across its top for receiving the chain; and the block, in a modified design, including a warning bell, so a wheel does not roll off the opposite end of the block.

1 Claim, 5 Drawing Figures

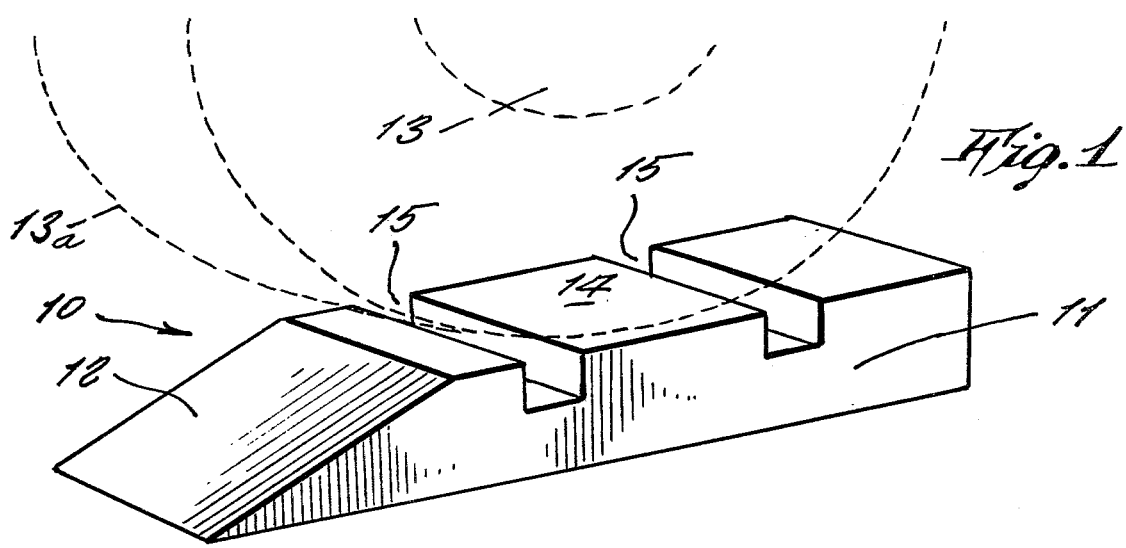
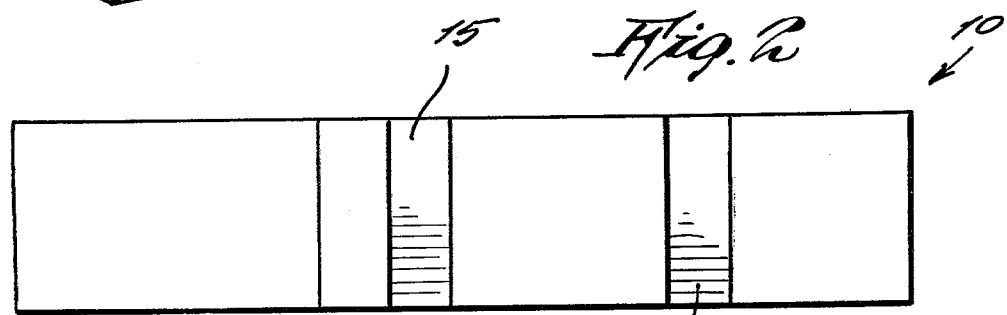
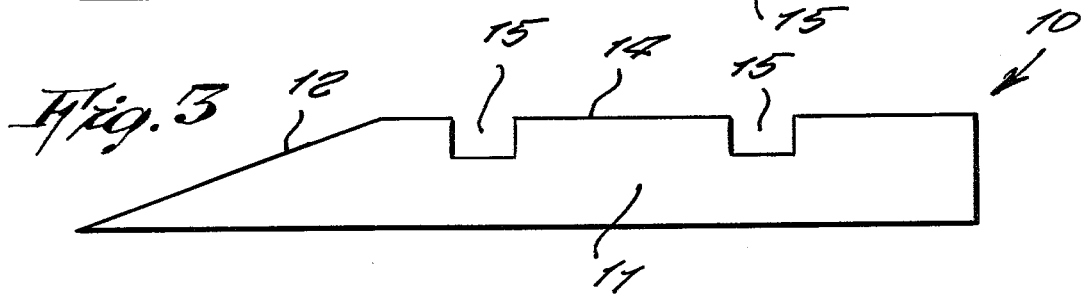
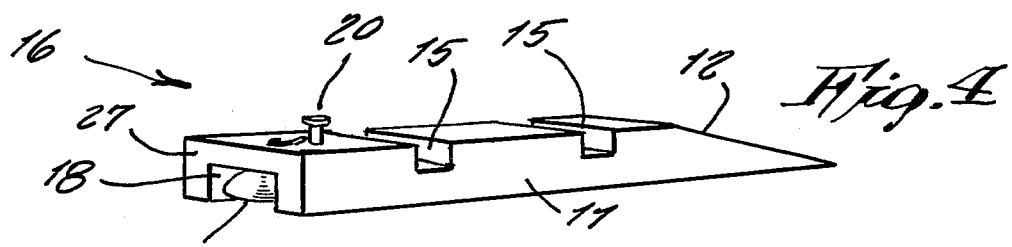
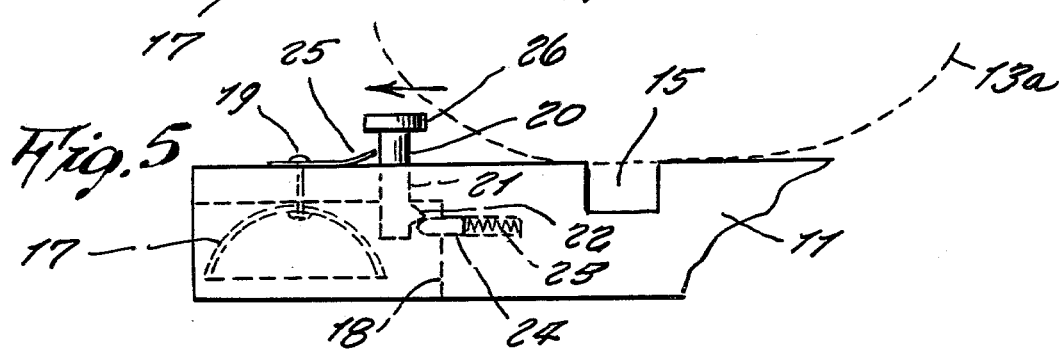

CHAINMATE

This invention relates generally to tire chain installation accessories.

It is well known to most motorists, that the installation of tire chains without jacking up a wheel is a difficult task for passing the chain cross links underneath, and necessitates rolling the vehicle sufficiently, and often without success. This situation is, accordingly, in want of an improvement.

Therefore, it is a principal object of the present invention to provide a chainmate comprising a wooden block, upon which the wheel can be rolled, the block having grooves through which the cross chain can be easily passed, while the wheel tire rests upon the top of the block supporting the vehicle weight.

Another object is to provide a chainmate, which, accordingly, saves time and effort to mount chains, and eliminates the dangerous practice of trying to jack up a vehicle on an icy surface, and the possibility of the jack skidding out and injuring a person.

Other objects are to provide a chainmate, which is simple in design, inexpensive to manufacture, rugged in construction, easy to use and efficient in operation.

These, and other objects, will be readily evident, upon a study of the following specifcation, and the accompanying drawing, wherein:

FIG. 1 is a perspective view of the invention;
FIG. 2 is a top view thereof;
FIG. 3 is a side view;
FIG. 4 is a perspective view of a modified design of the invention, and which includes a button near an end of the block, and which is depressed by the car wheel, so as to sound an alarm bell and warn the motorist to stop the car and not travel further, so as to prevent the wheel from traveling off the block's high end, and
FIG. 5 is a side view detail thereof, showing the alarm bell's simple mechanism.

Referring now to the drawing in greater detail, and more particularly, to FIGS. 1 through 3 thereof at this time, the reference numeral 10 represents a chainmate, according to the present invention, wherein the same comprises a single rectangular block 11 of wood, measuring approximately eighteen inches long, four inches wide and two inches high. An inclined ramp surface 12 is located at one end, so an automotive vehicle wheel 13, mounted with tire 13a, can ride up onto the block horizontal top surface 14.

A pair of transverse grooves 15 extend across the top of the block, the grooves being one and one-quarter inch wide and three-quarters inch deep. The grooves are spaced four and one-quarter inches apart from each other.

In operative use, the chain is laid out on the ground, with a cross chain component thereof resting in each of the grooves, so that, when the wheel is then driven to rest on top of the block, the chain is thus already positioned against the underside of the tire, so that opposite ends of the chain can then be wrapped around the top of the tire and buckled. The grooves allow freedom to slide the cross chains for adjustment in final position during this installation.

In FIGS. 4 and 5, a modified design of chainmate 16 is the same as chainmate 10, except that it additionally includes a bell 17 installed in a recess 18 under one end, the bell being suspended from a rivet 19. A vertically slidable pin 20, in a hole 21 of the block, is set up to project normally upwardly from the block by a lug 22 on a side of the pin resting upon a detent 24 biased by a spring 23, where the pin can be downwardly pushed by a tire. When thus depressed, the detent bearing against the passing lug forces the pin to move rapidly downwardly, so as to strike the bell, the pin at this lowest point of travel having depressed a leaf spring 25, by means of its head 26, the leaf spring immediately lifting the pin sufficiently so as to clear the bell and not stop the bell resonating sound. The bell serves to warn a motorist from driving too far up on the block, and falling off the block end 27.

While various changes may be made in the detail construction, it is understood that such changes will be within the spirit and scope of the present invention, as is defined by the appended claims.

What I now claim is:

1. A chainmate device, for use in conjunction with a tire chain installation, comprising, in combination, a rectangular wooden block, one end of said block having an angularly inclined surface forming a ramp for a wheel of an automotive vehicle to climb thereupon, a horizontal top wall upon a remainder of said block, and a plurality of transverse, spaced-apart grooves across said horizontal top wall for receiving cross chains of said tire chain; a vertically slideable pin being near an opposite end of said block, a bell being aligned below said pin for being struck thereby when said wheel rides thereupon; a sideward protruding lug along said pin overriding a spring biased detent of said block for quickly thrusting said pin downwardly against said bell, and a leaf spring normally urging said pin upwardly immediately thereafter so that said pin clears said bell and does not stop resonating sound therefrom.

* * * * *